United States Patent
Lindeman et al.

(10) Patent No.: US 9,546,599 B2
(45) Date of Patent: Jan. 17, 2017

(54) TURBINE ENGINE COMPRISING AN ELECTRICALLY ACTIVATED FUEL SUPPLY PUMP, AND TURBINE ENGINE FUEL SUPPLY METHOD

(71) Applicant: TURBOMECA, Bordes (FR)

(72) Inventors: Jean Lindeman, Jurancon (FR); Philippe Jean René Marie Benezech, Morlaas (FR); Jean-Luc Charles Gilbert Frealle, Pau (FR); Bertrand Moine, Gan (FR)

(73) Assignee: TURBOMECA, Bordes (FR)

( * ) Notice: Subject to any disclaimer, the term of this patent is extended or adjusted under 35 U.S.C. 154(b) by 393 days.

(21) Appl. No.: 14/354,343

(22) PCT Filed: Nov. 28, 2012

(86) PCT No.: PCT/FR2012/052742
§ 371 (c)(1),
(2) Date: Apr. 25, 2014

(87) PCT Pub. No.: WO2013/098498
PCT Pub. Date: Jul. 4, 2013

(65) Prior Publication Data
US 2014/0298819 A1    Oct. 9, 2014

(30) Foreign Application Priority Data

Nov. 29, 2011 (FR) ..................... 11 60887

(51) Int. Cl.
*F02C 7/22* (2006.01)
*F01D 15/08* (2006.01)
*F01D 15/10* (2006.01)
*F02C 7/32* (2006.01)

(52) U.S. Cl.
CPC ................ *F02C 7/22* (2013.01); *F01D 15/08* (2013.01); *F01D 15/10* (2013.01); *F02C 7/32* (2013.01); *Y02T 50/671* (2013.01)

(58) Field of Classification Search
CPC ............... F02C 7/22; F02C 7/236; F02C 7/32; F01D 15/08; F01D 15/10; Y02T 50/671
See application file for complete search history.

(56) References Cited

U.S. PATENT DOCUMENTS

| | | |
|---|---|---|
| 1,343,666 A | 6/1920 | Ehrhart |
| 1,364,488 A | 1/1921 | Doble |
| 2,949,731 A | 8/1960 | Hambling |
| 8,484,977 B2 * | 7/2013 | Bader ............... F02C 7/236 60/39.281 |
| 2010/0242496 A1 | 9/2010 | Cass et al. |
| 2014/0219826 A1 * | 8/2014 | Clements ........... F02C 7/236 417/53 |

FOREIGN PATENT DOCUMENTS

| | | |
|---|---|---|
| DE | 196 30 792 | 10/1997 |
| EP | 2 239 440 | 10/2010 |
| JP | 2001-271656 | 10/2001 |
| WO | 00/46488 | 8/2000 |

OTHER PUBLICATIONS

International Search Report issued Mar. 13, 2013 in PCT/FR12/52742 filed Nov. 28, 2012.

* cited by examiner

*Primary Examiner* — Arun Goyal
(74) *Attorney, Agent, or Firm* — Oblon, McClelland, Maier & Neustadt, L.L.P.

(57) ABSTRACT

A turbine engine for an aircraft including a turbine engine shaft and a pumping module, including: a pump shaft, connected to the turbine engine shaft; a pump for supplying fuel to the turbine engine, mounted on the pump shaft, configured to deliver a flow of fuel as a function of a speed of rotation of the turbine engine shaft; and an electrical device mounted on the pump shaft and configured, according to a first mode of operation, to drive the pump shaft in rotation to actuate the supply pump and, according to a second mode of operation, to be driven in rotation by the pump shaft to supply electrical power to equipment of the turbine engine.

15 Claims, 6 Drawing Sheets

TURBINE ENGINE COMPRISING AN ELECTRICALLY ACTIVATED FUEL SUPPLY PUMP, AND TURBINE ENGINE FUEL SUPPLY METHOD

The present invention relates to the field of fuel supply to turbine engines of aircraft, in particular of helicopter turboshaft engines.

With reference to FIG. 1, a helicopter turboshaft engine conventionally includes a main high-pressure pump PHP which draws off fuel in a high-capacity tank 2 of the helicopter in order to deliver it to metering devices 4 of the turboshaft engine. The high-pressure pump PHP is of the volumetric type and is mounted on a shaft of the turboshaft engine 1 in order to deliver a flow of fuel which is a function of the speed at which the shaft of the turboshaft engine 1 is driven. Conventionally, the shaft of the turboshaft engine 1 is driven by an accessories box 10 of the turbine engine, known to the person skilled in the art by its English designation "gear box". In a known manner, the turboshaft engine also includes an auxiliary low-pressure pump PBP which is mounted with the high-pressure pump PHP on the shaft of the turboshaft engine 1 as shown in FIG. 1.

Still with reference to FIG. 1, the turboshaft engine traditionally includes a filter unit 2' which conventionally comprises a fuel filter, a filter cartridge, a bell housing and a bypass (switch). Such a filter unit 2' makes it possible to purify the fuel before it is injected into the combustion chamber of the turboshaft engine.

When the fuel filter or the filter cartridge of the filter unit 2' must be replaced, the fuel is drained from the filter unit 2' and air penetrates into the filter unit 2'. In order to switch on the turboshaft engine, it is necessary to fill the filter unit 2' with fuel again. The fuel pumps PBP, PHP are of no help as they are joined to the shaft of the turboshaft engine 1. During the replacement of the filters, air penetrates into the fuel circuit, which can lead to complete emptying, by gravity, of the supply pipeline situated between the fuel tank and the turboshaft engine. When the turboshaft engine is stopped, the fuel pumps PBP, PHP remain inactive. In a known manner, in order to eliminate this drawback, a helicopter includes a priming pump, also known as a "booster pump", which is independent of the turboshaft engine and makes it possible to raise the fuel from the fuel tank 2, situated in the lower part of the helicopter, towards the turboshaft engine, situated in the upper part of the helicopter. The priming pump makes it possible to fill the filter unit 2' and the supply pipeline with fuel in order to enable starting of the turboshaft engine.

In order to reduce the mass of a helicopter and to decrease the complexity thereof, it has been proposed to omit the priming pump from the helicopter. In order to fill the filter unit 2' with fuel, it is then necessary to carry out a maintenance step, for example by means of a manual pump, necessitating immobilisation of the helicopter, which presents a drawback.

In order to eliminate at least some of these drawbacks, the invention aims to propose a fuel pumping module for a turboshaft engine, and more generally for a turbine engine, which enables quick starting of the turboshaft engine irrespective of the quantity of fuel present in the filter unit and in the supply pipeline.

To this end, the invention relates to a turbine engine for aircraft, including a turbine engine shaft and a pumping module, comprising:

a pump shaft, connected to the turbine engine shaft, a pump for supplying fuel to the turbine engine, mounted on said pump shaft and adapted to deliver a flow of fuel as a function of the speed of rotation of the turbine engine shaft and an electrical device which is mounted on said pump shaft and is adapted, according to a first mode of operation, to drive said pump shaft in rotation in order to actuate the supply pump and, according to a second mode of operation, to be driven in rotation by said pump shaft in order to supply electrical power to equipment of the turbine engine.

The electrical device makes it possible in an advantageous manner to start the turbine engine without taking account of the fuel filling level of the supply pipeline and of the filter unit at the moment before starting, wherein the supply pump van be supplied previously, when the turbine engine is stopped. The duration of maintenance in order to change a fuel filter of the filter unit can thus be reduced, as no manual filling has to be carried out. Furthermore, by virtue of the invention, it is possible to prime the starting of the turbine engine quickly and reliably, the priming being decoupled from the starting and from the ignition phase. The invention applies more particularly to a helicopter which does not include a fuel supply pump, that is to say a booster pump.

Preferably, the pumping module includes coupling/decoupling means adapted in order to decouple the turbine engine shaft and the pump shaft according to the first mode of operation and in order to couple them according to the second mode of operation.

Thus, the coupling/decoupling means make it possible advantageously to render independent the activation of the pump for rotation of the turbine engine shaft. The pump can advantageously be activated without driving the turbine engine shaft.

Preferably, the coupling/decoupling means are configured in order to couple the turbine engine shaft and the pump shaft when the speed of rotation of the turbine engine shaft is greater than or equal to the speed of rotation of the pump shaft. Thus a reliable driving of the fuel supply pump, in particular in flight, is guaranteed whilst protecting the turbine engine shaft.

Preferably, the coupling/decoupling means are passive, which limits the cost and increases the reliability thereof. The coupling/decoupling means preferably have the form of a free wheel.

The turbine engine preferably includes a digital regulator of the turbine engine which is adapted in order to control the mode of operation of the electrical device. The turbine engine preferably includes electrical equipment connected to the electrical device in order to be supplied by this latter when the turbine engine shaft and the pump shaft are coupled. Thus a digital regulator, for example, of the FADEC type can control and be supplied by the electrical device.

The invention preferably relates to a turboshaft engine for a helicopter as a particular type of turbine engine.

The invention also relates to a method for supplying fuel to a turbine engine for aircraft including a turbine engine shaft and a pumping module comprising a pump shaft, connected to the turbine engine shaft, a pump for supplying fuel to the turbine engine, mounted on said pump shaft and adapted to deliver a flow of fuel as a function of the speed of rotation of the turbine engine shaft and an electrical device, mounted on said pump shaft, a method in which:

previously or simultaneously with a starting phase of the turbine engine, the electrical device drives the pump shaft in rotation in order to actuate the supply pump during a priming phase;

after starting of the turbine engine, the electrical device is driven in rotation by the pump shaft in order to supply electrical power to equipment of the turbine engine.

By virtue of the method according to the invention, electrical energy is used for supplying the supply pump during the priming phase and is generated when the turbine engine is started. Thus the electrical device according to the invention fulfils a double function.

The turbine engine shaft and the pump shaft are preferably decoupled during starting of the turbine engine and coupled after starting of the turbine engine. Thus, the turbine engine is protected when it is stopped, as the turbine engine shaft is detached from the pump shaft, no coupling being received by the turbine engine shaft.

Preferably, the shaft of the turbine engine and the pump shaft are coupled when the turbine engine shaft reaches a speed of rotation greater than the speed of rotation of the pump shaft. Thus when the starting of the turbine engine is effective the pump is driven by the turbine engine shaft.

More preferably, since the aircraft is capable of flying from a threshold speed of the turbine engine shaft, the turbine engine shaft and the pump shaft are coupled at a coupling speed less than said threshold speed. Thus, the risk of accident in the event of malfunction during the coupling is limited, as a possible malfunction can only occur on the ground.

Preferably, the priming phase and the starting phase are separated by a time delay, and thus the supply pump can be activated independently in order to start the supply circuit prior to the starting of the turbine engine. By way of example, it is thus possible to fill a filter unit of the turbine engine independently and to start the turbine engine at a later stage.

The invention will be better understood when reading the following description given solely by way of example and with reference to the appended drawings, in which.

It should be noted that the drawings disclose the invention in a detailed manner in order to carry out the invention, and said drawings can of course serve to give a better definition of the invention where appropriate.

A first embodiment of a turbine engine according to the invention is illustrated with reference to FIG. 3A, the turbine engine includes a rotatable shaft 1 which is driven in rotation, in this example, by an accessories box 10 of the turbine engine, better known to the person skilled in the art under its English designation "gearbox". Of course the invention can apply to any rotatable shaft of the turbine engine. When the turbine engine is started, the accessories box 10 drives the shaft of the turbine engine 1 in rotation as represented by the arrow in FIG. 3A.

Figure 3A:
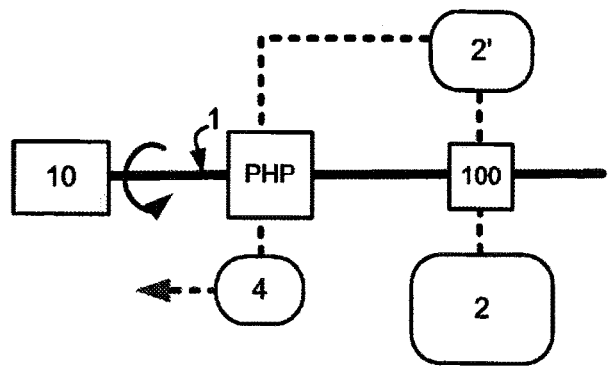
FIG. 3A shows a schematic representation of a first embodiment of a turbine engine with a pumping module according to the invention.

The turbine engine of FIG. 3A conventionally includes a high-capacity fuel tank 2 and a filter unit 2' as presented above which includes by way of example a fuel filter, a filter cartridge, a bell housing and a bypass (switch). The turbine engine conventionally includes metering devices 4 adapted in order to distribute the fuel coming from the reservoir 2 in the turbine engine. In this example, the metering devices 4 are connected to the tank by a supply pipeline.

In order to enable the routing of the fuel from the tank 2 to the metering device 4, the turbine engine also includes one or several supply pumps. By way of example, with reference to FIG. 3A, the turbine engine includes a high-pressure pump PHP, such as the one presented above, adapted in order to route the fuel from the filter unit 2' towards the metering devices 4 but likewise a pumping module 100 adapted in order to route the fuel from the tank 2 towards the filter unit 2'.

Figure 1:
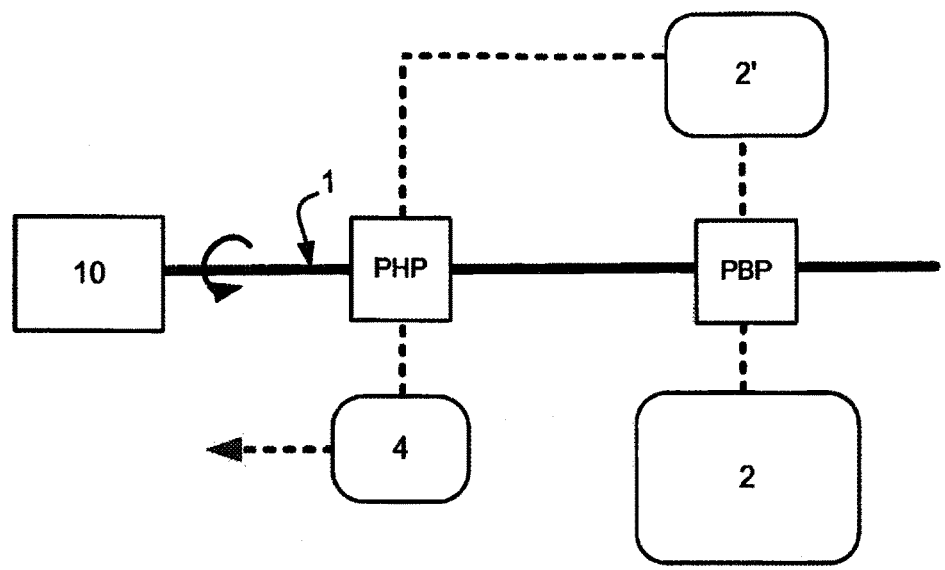
FIG. 1 shows a schematic representation of a turbine engine according to the prior art (already mentioned)

In other words, in this first embodiment illustrated in FIG. 3A, the low-pressure pump PBP of the turbine engine of FIG. 1 according to the prior art is replaced by a pumping module 100 according to the invention.

Figure 3B:
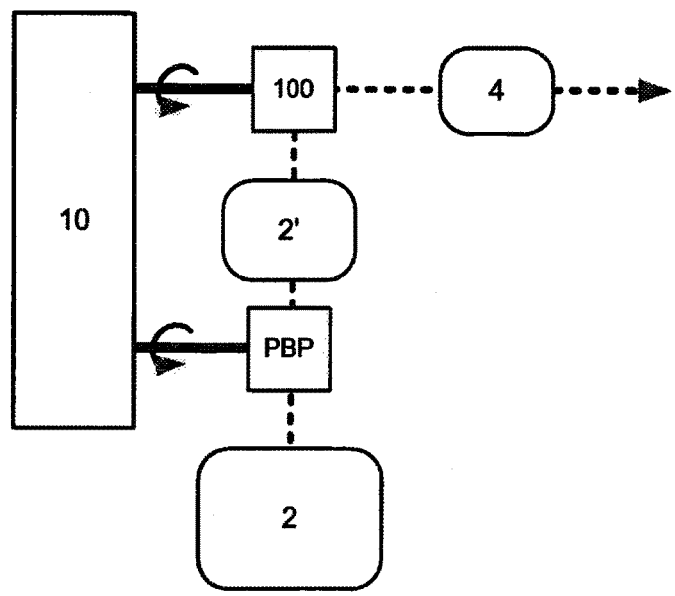
FIG. 3B shows a schematic representation of a second embodiment of a turbine engine with a pumping module according to the invention.

Of course the pumping module 100 may be substituted for any fuel supply pump, regardless of whether it is a high-pressure pump (PHP) or a low-pressure pump (PBP), in any type of configuration of the turbine engine. By way of example, FIG. 3B shows a second configuration of a turbine engine in which the pumping module 100 is substituted for a low-pressure supply pump for a turbine engine comprising two pumps driven by separate shafts of the turbine engine. Of course the pumping module 100 according to the invention could likewise replace the high-pressure pump PHP.

Figure 3C:
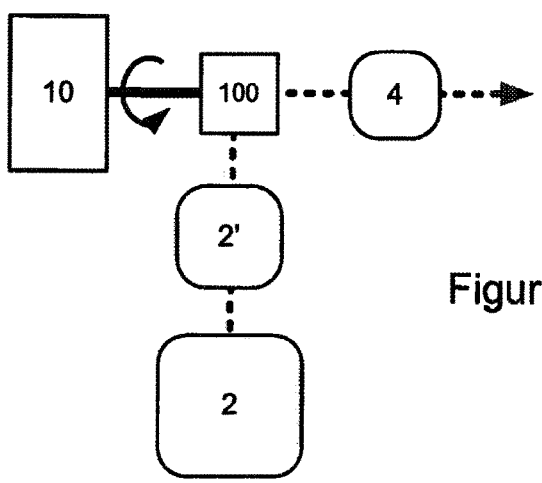
FIG. 3C shows a schematic representation of a third embodiment of a turbine engine with a pumping module according to the invention.

Similarly, the pumping module 100 according to the invention may be substituted for a supply pump of a turbine engine including a single supply pump as shown in FIG. 3C.

Pumping Module 100

Figure 2A:
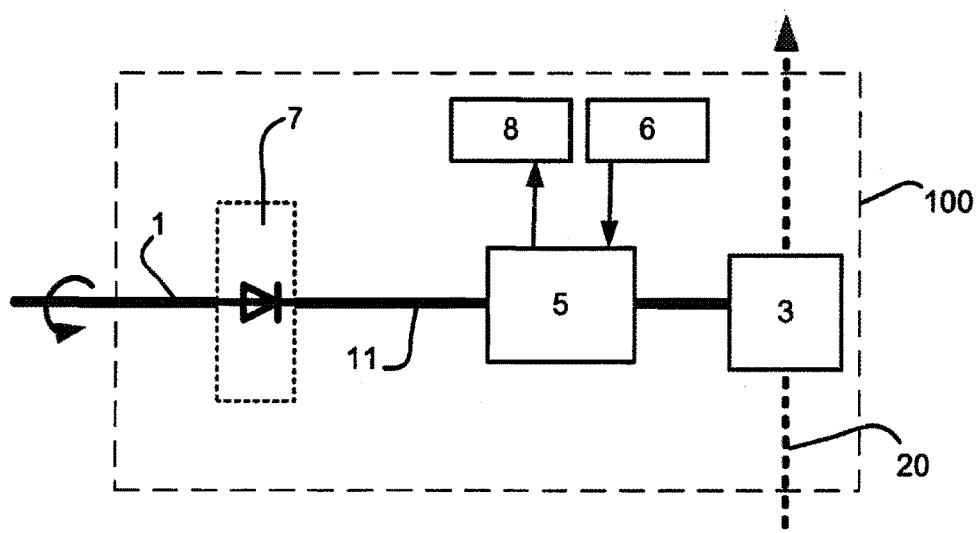
FIG. 2A shows a representation of a first embodiment of a pumping module according to the invention.

A first embodiment of a pumping module 100 is shown with reference to FIG. 2A. The pumping module 100 includes a pump shaft 11 on which are mounted a supply pump 3 and an electrical device 5 as shown in FIG. 2A, the pump shaft 11 being connected to the shaft of the turbine engine 1 by coupling/decoupling means 7.

Supply Pump 3

The supply pump 3 is activated during the rotation of the pump shaft 11 on which it is mounted. The supply pump 3 is preferably a volumetric pump which delivers, in a supply conduit 20, a flow of fuel which is a function of the speed of rotation of the pump shaft 11. The supply conduit 20 preferably connects a high-capacity tank 2 fluidically to a filter unit 2' of the turbine engine.

Electrical Device 5

The electrical device 5 is adapted, according to a first mode of operation, in order to drive the pump shaft 11 in rotation. Consequently this first mode of operation of the electrical device 5 is designated as "motor mode of operation". Moreover, the electrical device 5 is adapted, according to a second mode of operation, in order to take off the mechanical energy on the pump shaft 11 in order to supply at least one item of electrical equipment 8 of the turbine engine. Consequently this second mode of operation of the electrical device 5 is designated as "generator mode of operation".

By way of example, the electrical device 5 is connected to the electrical network for starting the aircraft on which the turbine engine is mounted, in particular that of a helicopter. The electrical device 5 is preferably adapted to be connected to an electrical network supplied at an on-board network voltage.

Thus, advantageously, the electrical device 5 makes it possible to activate the supply pump 3 when the shaft of the turbine engine 1 is not driven in rotation, that is to say, when the turbine engine is stopped. Once the turbine engine is started, the electrical device 5 can take off mechanical power on the pump shaft 11 in order to convert it into electrical energy and to supply an item of electrical equipment 8 of the turbine engine.

By way of example, the electrical device 5 is connected electrically to a digital regulator 6 of the turbine engine, better known by its English acronym FADEC, which makes it possible to control the mode of operation of the turbine engine. The digital regulator 6 is preferably connected to the electrical device 5 by means of an electrical power interface. Thus the digital regulator 6 can control the mode of operation of the electrical device 5 and can be supplied by this latter.

Coupling/Decoupling Module 7

Preferably, the pumping module 100 includes coupling/decoupling means 7 adapted in order to couple the shaft of the turbine engine 1 to the pump shaft 11 when the electrical device 5 functions in generator mode and in order to decouple them when the electrical device 5 functions in motor mode. Thus, advantageously, when the electrical device 5 drives the pump shaft 11, the shaft of the turbine engine 1 is not driven, which protects the shaft of the turbine engine 1 and the mechanical elements for driving the shaft of the turbine engine 1, for example a gear box 10.

The coupling/decoupling means 7 preferably have the form of a free wheel 7 which is preferably lubricated with fuel in order to facilitate maintenance thereof. According to a preferred embodiment, the coupling/decoupling means 7 are configured in order to couple the shaft of the turbine engine 1 and the pump shaft 11 when the speed of rotation of the shaft of the turbine engine 1 is greater than or equal to the speed of rotation of the pump shaft 11 in order to enable continuous driving of the pump shaft 11.

According to a preferred aspect, the coupling/decoupling means 7 are passive so as to allow automatic coupling/decoupling as a function of the speeds of rotation of the shaft of the turbine engine 1 and of the pump shaft 11. By way of example, the decoupling means 7 have the form of a free wheel, an overrunning clutch or a centrifugal, e.g. hydraulic, device.

Of course, the coupling/decoupling means 7 could also be active means. By way of example, the active coupling/decoupling means have the form of a gear box, a planetary gear train or a clutch.

Figure 2B:
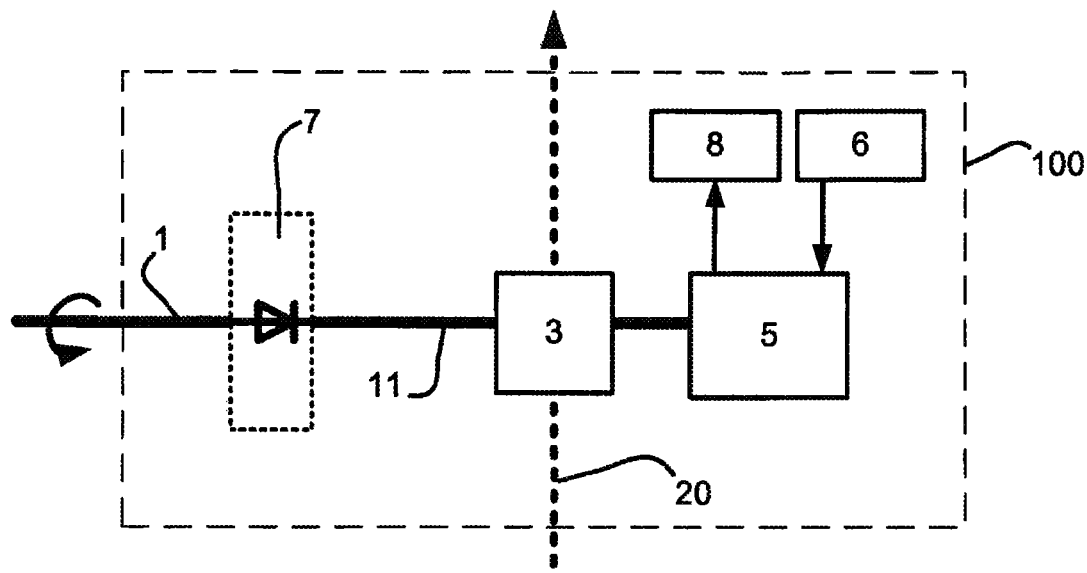
FIG. 2B shows a representation of a second embodiment of a pumping module according to the invention.

With reference to the pumping module 100 of FIG. 2A, the electrical device 5 is mounted between the coupling/decoupling means 7 and the supply pump 3. Of course other configurations of the pumping module 100 are likewise possible. By way of example the supply pump 3 can be mounted between the coupling/decoupling means 7 and the electrical device 5 as shown in FIG. 2B.

Figure 2C:
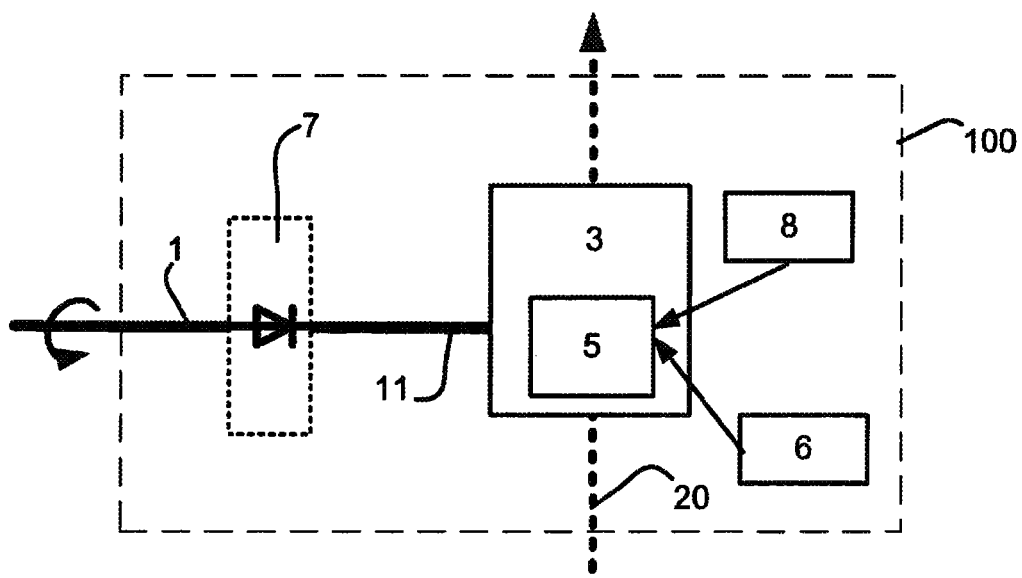
FIG. 2C shows a representation of a third embodiment of a pumping module according to the invention.

The supply pump 3, the coupling/decoupling means 7 and the electrical device 5 have been previously presented in the form of separate elements but of course they can all be grouped together or in modules. By way of example the supply pump 3 includes the electrical device 5 in the pumping module 100 as shown in FIG. 2C.

Figure 5:
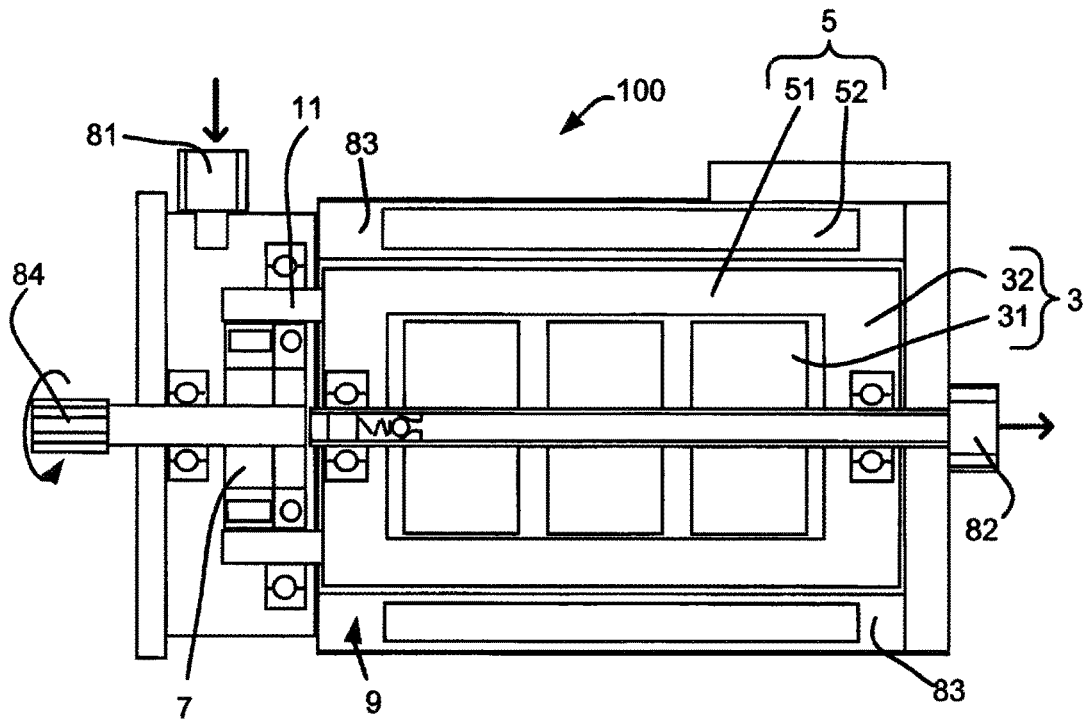
FIG. 5 shows a schematic representation of a first specific embodiment of a pumping module according to the invention.
Figure 6:
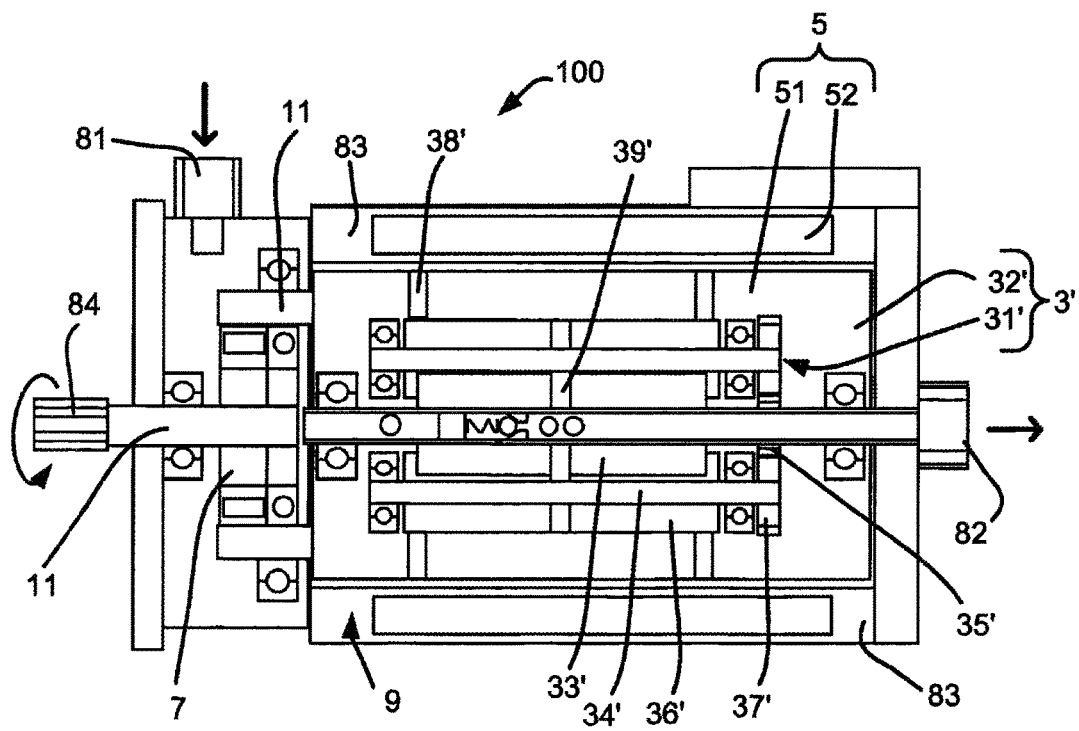
FIG. 6 shows a schematic representation of a second specific embodiment of a pumping module according to the invention.

By way of example, FIGS. 5 and 6 show two specific embodiments of a pumping module 100 according to the invention including a supply pump 3, an electrical device 5 and coupling/decoupling means 7.

Pumping Module 5 of FIG. 5

As shown in FIG. 5, the pumping module 100 includes a structural housing 9 in which are arranged a suction flange 81, in order to draw off fuel from the tank 2, and a delivery flange 82, in order to supply for example a filter unit 2' of the turbine engine illustrated in FIG. 2. The pumping module 100 includes a fuel supply pump 3 mounted inside the structural housing 9. With reference to FIG. 5, the pump 3 includes a first fixed central part 31, joined to the structural housing 9, comprising a hollow delivery shaft connected to the delivery flange 82 and a movable part 32 mounted outside the fixed central part 31 thereof. The movable part 32 of the pump 3 is mounted inside a fixed external crown 83 of the structural housing 9. In other words, the pumping module 100 includes, from the interior towards the exterior from its central axis, the fixed part 31 of the pump 3, then a movable part 32 of the pump 3 and finally an external crown 83 joined to the structural housing 9.

The pumping module 100 comprises a power take-off element 84 which is connected to the movable part 32 of the pump 3 via a free wheel 7 which ensures the coupling/decoupling as shown in FIG. 5. In this example, the shaft of the turbine engine 1 of the accessories box 10 is adapted in order to be connected to the power take-off element 84 in order to drive the movable part 32. In other words, the movable part 32 corresponds to the pump shaft 11 as described previously, the free wheel 7 being adapted in order to couple/decouple the turbine engine shaft 1, connected to the power take-off element 84, and the pump shaft 11, joined to the pump 3.

The rotation of the movable part 32 of the pump 3 makes it possible advantageously to draw off fuel from the suction flange 81 towards the delivery flange 82. The supply pump 3 may be of the gerotor type, gears, liquid ring/lateral channels, lobes, screw pump or the like. In this example, the free wheel 7 is a roller free wheel.

The movable part 32 of the pump 3 includes rotor elements 51 on its external periphery whilst the internal periphery of the fixed external crown 83 of the structural housing 9 includes stator elements 52 in such a way as to form an electrical device 5 enabling driving of the movable part 32 of the pump 3 (motor mode of operation) or the recovery of energy from the rotation of the movable part 32 of the pump 3 (generator mode of operation).

The integration of the electrical device 5 in the pump 3 makes it possible to reduce the space required and the mass of the pumping module 100.

Pumping Module 6 of FIG. 6

FIG. 6 shows a preferred embodiment of the pumping module 100 of FIG. 5. In this example, the supply pump 3 is a screw pump with three synchronised screws. As illustrated in FIG. 6, the supply pump is a screw pump 3' comprising a fixed central part 31' and a movable external part 32'. The supply pump 3' advantageously includes two groups of reverse-pitch screws in such a way as to compensate for the radial forces of the fuel on the screws.

Very precisely, with reference to FIG. 6, the supply screw pump 3' includes a central screw 33' mounted inside a satellite shaft 34' mounted on the hollow delivery shaft connected to the delivery flange 82 via a central synchronising gear 35'. The supply screw pump 3' also includes satellite screws 36' mounted on the satellite shaft 34' via satellite synchronising gears 37' as shown in FIG. 6.

In this example, the movable part 32' of the screw pump 3' includes radial supply channels 38' and the screws 33', 36' include delivery channels 39'. When the screw pump 3' is activated, fuel circulates from the supply flange 81 towards the radial supply channels 38' of the movable part 32' of the screw pump 3', towards the delivery channels 39' of the screws 33', 36' in order finally to be led into the hollow delivery shaft connected to the delivery flange 82.

Conventionally, the fuel pumping module 100 likewise includes means for fixing to the turbine engine in order to enable the integration of the device with the turbine engine.

Implementation

Implementation of the pumping module 100 of FIG. 3A will now be described for a turbine engine as configured in FIG. 2A, but of course this description applies in a similar manner to any embodiment of the pumping module and for any configuration of turbine engine.

Figure 4A:
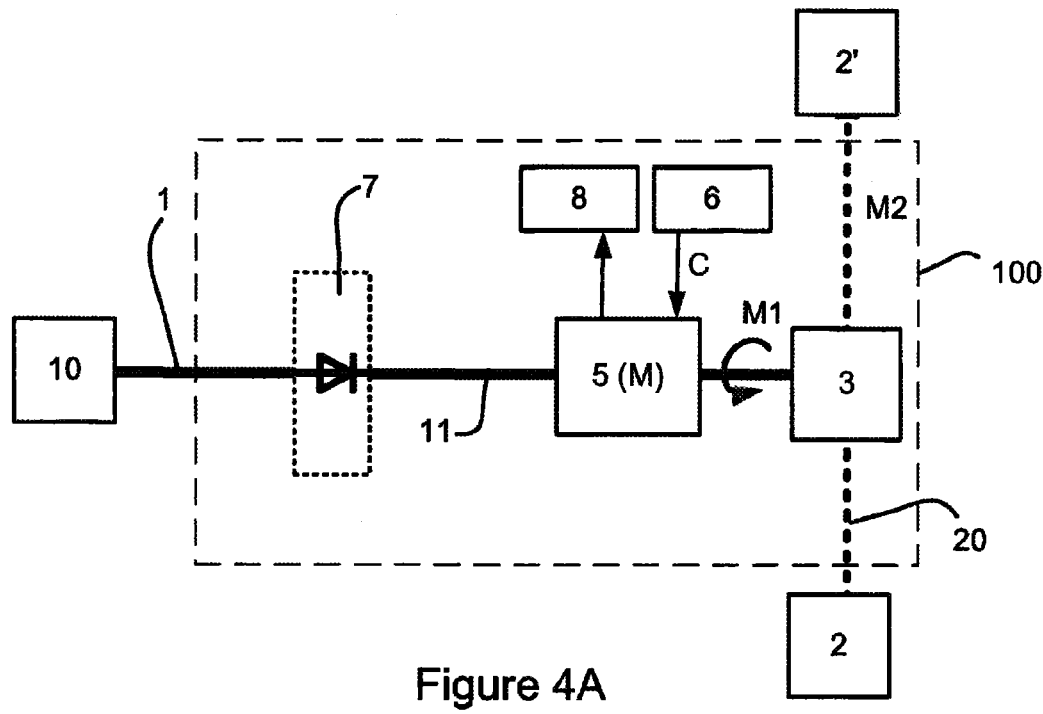
FIG. 4A shows a schematic representation of the operation in motor mode of the pumping module of FIG. 2A.
Figure 4B:
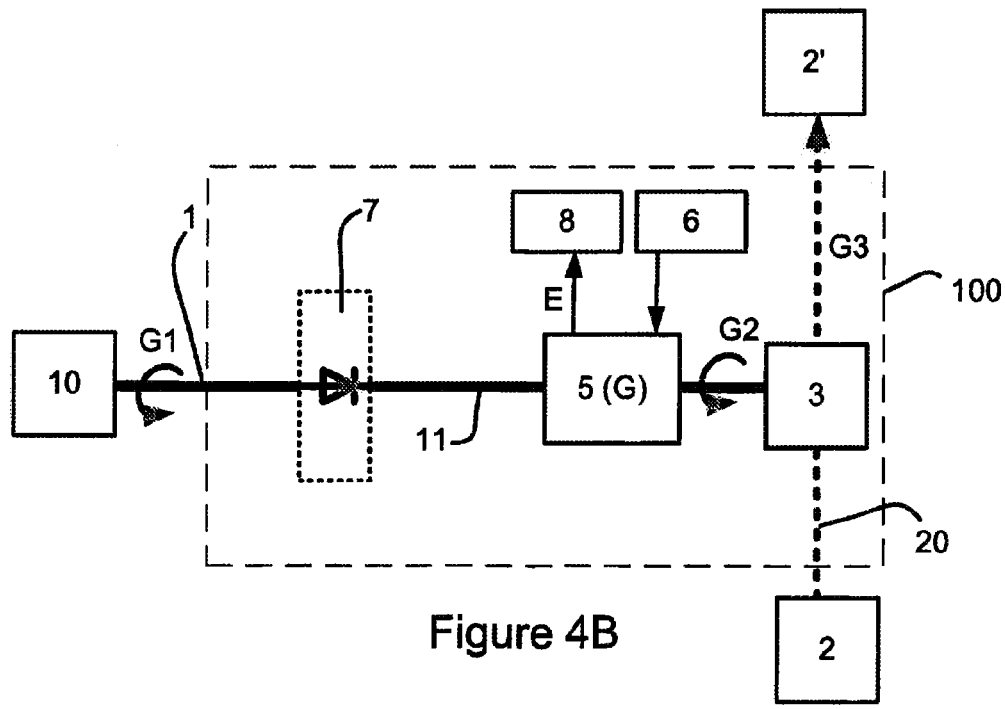
FIG. 4B shows a schematic representation of the operation in generator mode of the pumping module of FIG. 2A.

The operation of the pumping module 100 will be described when the electrical device 5 functions in motor mode (FIG. 4A) and when the electrical device 5 functions in generator mode (FIG. 4B).

With reference to FIG. 4A, in order to start the turbine engine, which is switched off, the electrical device 5 receives a control command C from the digital regulator 6 in order for this latter to function in motor mode M. The electrical device 5 drives the pump shaft 11 in rotation (step M1), which actuates the supply pump 3 which can draw off the fuel in the tank 2 in order to supply fuel to the filter unit 2' (step M2). In this state, the coupling/decoupling means 7 decouple the pump shaft 11 from the turbine engine shaft 1 as the speed of rotation of the pump shaft 11 is higher than that of the shaft of the turbine engine 1.

Thus, the turbine engine shaft 1 is not driven in rotation, which protects the accessories box 10 of the stopped turbine engine.

Thus, during the starting, it is the electrical device 5 which actuates the supply pump 3 and not the accessories box 10 of the stopped turbine engine. Such an electrical device 5 is advantageous since it requires little space and makes it possible to start the turbine engine without taking account of the level of fuel in the filter unit 2'. The supply pump 3 can be actuated on demand, irrespective of the operating status of the turbine engine, which makes it possible to supply fuel to the turbine engine at any moment. This is particularly advantageous in order to replace fuel filters of the turbine engine, as will be detailed below during the presentation of the control profile for activation of the electrical device 5 and starting of the turbine engine.

With reference to FIG. 4B, once the turbine engine is started, the accessories box 10 of the turbine engine drives the shaft of the turbine engine 1 in rotation (step G1). In this state, the coupling/decoupling means 7 couple the pump shaft 11 to the shaft of the turbine engine 1 as the speed of rotation of the pump shaft 11 is lower than that of the turbine engine shaft 1. Thus, the rotation of the turbine engine shaft 1 drives the rotation of the pump shaft 11 (step G2), which actuates the supply pump 3 which can draw off the fuel in the tank 2 in order to supply fuel to the filter unit 2' (step G3). More preferably, the electrical device 5 receives a command order from the digital regulator 6 so that the latter functions in generator mode G. The electrical device 5 takes off mechanical power on the pump shaft 11 and converts it into electrical energy and supplies electrical equipment 8 of the turbine engine.

Control Profiles

FIGS. 7 to 10 show different control profiles for activation of the electrical device 5 of the pumping module 100 (CE) and of the starting of the turbine engine (CT). A control command CE of the electrical device 5 is understood to be driving of the supply pump 3 by the electrical device 5 functioning in motor mode. In these drawings, the speeds of rotation V of the turbine engine shaft V1 (solid line) and of the pump shaft V11 (broken line) are represented as a function of the control profiles of the electrical device 5 and of the turbine engine.

Figure 7:
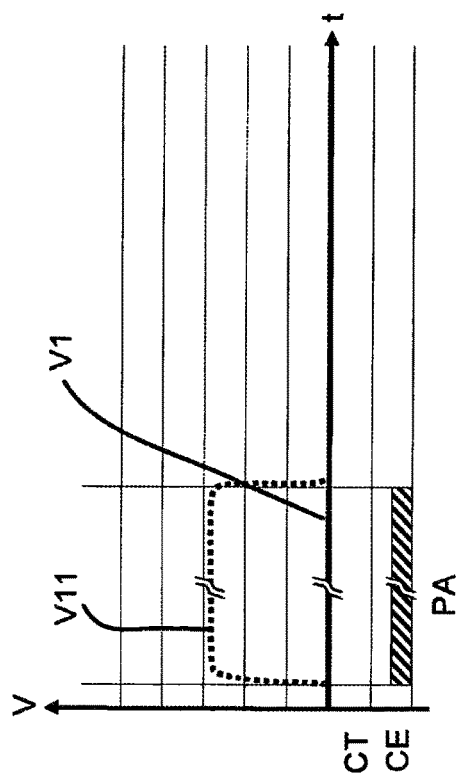

FIG. 7 shows an activation of the electrical device 5 (CE=1) when the turbine engine is stopped (CT=0). During this control only the pump shaft 11 is driven, which makes it possible to supply the pump 3 in order, for example, to fill the filter unit 2' with fuel after replacement of the filter cartridge. The filling of the filter unit 2' with fuel is automatic and does not require any step of maintenance necessitating immobilisation of the aircraft on which the turbine engine is mounted. Consequently, the control profile of FIG. 7 is designated as the priming phase PA.

Figure 8:
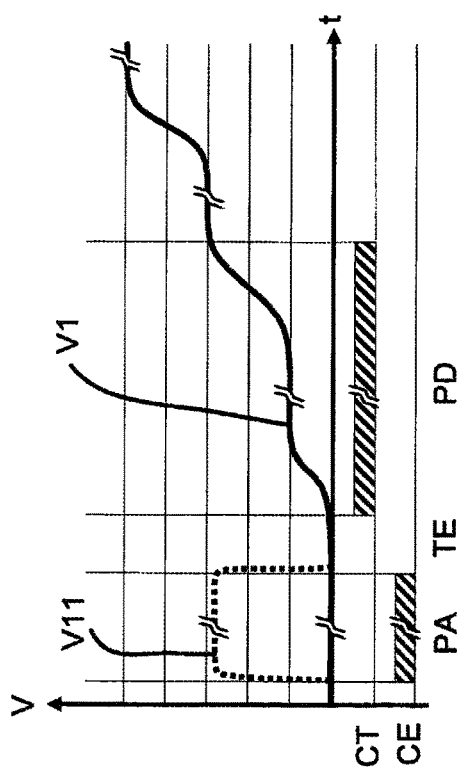
FIGS. 7 to 10 represent the speed of rotation of the drive shaft of the turbine engine (solid line) and the speed of rotation of the pump shaft (broken line) as a function of the control of the electrical device and of the control of the starting of the turbine engine.

FIG. 8 shows the priming phase PA of FIG. 7 followed by a starting phase PD in which the turbine engine is switched on (CT=1). With reference to FIG. 8, the electrical device 5 is not activated (CE=0) during the starting phase PD and the coupling/decoupling means 7 couple the shaft of the turbine engine 1 to the pump shaft 11 as the speed of the shaft of the turbine engine V1 is higher than that of the pump shaft V11. Thus, the speed curves V1, V11 of the shafts 1, 11 are merged in the course of the starting phase as shown in FIG. 8. In this example, still with reference to FIG. 8, the priming phase PA is followed by a time delay TE then by the starting phase PD. Thus, the priming phase PA is a phase which precedes the starting and aims to guarantee that the filter unit 2' is supplied with fuel before controlling effective starting of the turbine engine. Of course the priming phase PA could be directly followed by the starting phase PD.

Figure 9:
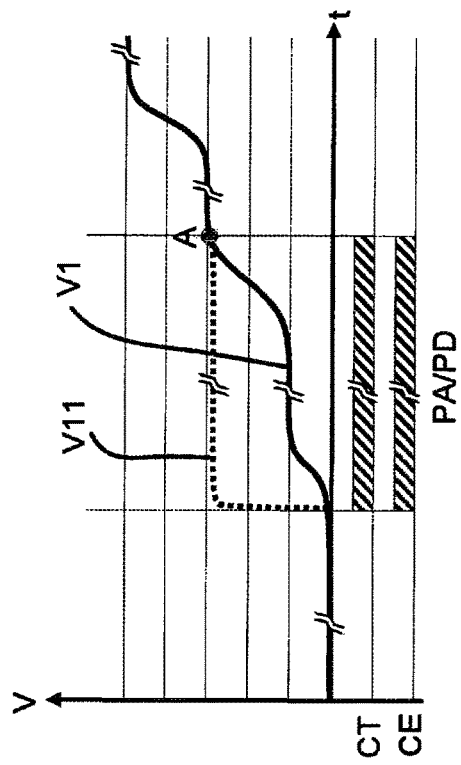

FIG. 9 shows a priming phase PA and a concomitant starting phase PD. In this example, the turbine engine is switched on (CT=1) at the same time as the electrical device 5 (CE=1). During this phase the speed V11 of the pump shaft 11 increases quickly in such a way as to allow activation of the supply pump 3. On the other hand, the speed V1 of the shaft of the turbine engine 1 increases slowly in such a way as to allow an increase in the speed of the turbine engine in stages (starting, acceleration, ground idle, etc.).

At the start of the control profile, the speed V1 of the shaft of the turbine engine 1 is less than that of the pump shaft 11. The coupling/decoupling means 7 decouple the shaft of the turbine engine 1 from the pump shaft 11. When the speed V1 of the shaft of the turbine engine 1 is equal to or exceeds the speed V11 of the pump shaft 11, the coupling/decoupling means 7 couple the shaft of the turbine engine 1 and the pump shaft 11 at a coupling point referenced A in FIG. 9.

Advantageously, the time of starting the turbine engine is reduced when the priming phase PA and the starting phase PD are concomitant.

The speed of rotation V11 of the pump shaft 11 is preferably adapted in order to correspond to a speed of rotation of the turbine engine less than its flying speed. Thus, the coupling point A is involved of necessity when the aircraft is still on the ground. This makes it possible to limit the risks in the event of failure of the coupling and thus increases the safety.

Figure 10:
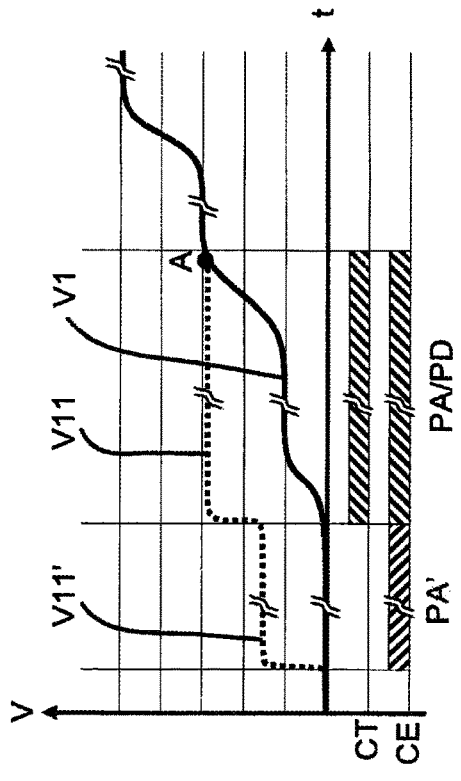

As a variant, with reference to FIG. 10, the priming phase PA and the concomitant starting phase PD may be preceded by a preliminary priming phase PA' in which the activation pump 3 is driven in rotation by the electrical device 5 at a reduced speed of rotation V11'. Such a preliminary priming phase PA' makes it possible to set the pump shaft 11 in rotation by speed increments, which favours smooth coupling of the shaft of the turbine engine 1 and of the pump shaft 11. Of course the priming phase PA could also be directly followed by a time delay TE.

The invention claimed is:

1. A turbine engine for an aircraft including a shaft of a turbine engine and a pumping module, comprising:
   a structural housing including a suction flange, to draw off fuel from a tank, and a delivery flange;
   a pump shaft connected to the shaft of the turbine engine;
   a supply pump for supplying the fuel to the turbine engine, mounted on the pump shaft and mounted inside the structural housing, configured to deliver a flow of the fuel as a function of a speed of rotation of the shaft of the turbine engine, the supply pump including a first fixed central part, joined to the structural housing, including a hollow delivery shaft connected to the delivery flange and a movable part mounted outside the fixed central part thereof;
   an electrical device mounted on the pump shaft and configured, according to a first mode of operation, to drive the pump shaft in rotation to actuate the supply pump and, according to a second mode of operation, to be driven in rotation by the pump shaft to supply electrical power to an equipment of the turbine engine, the electrical device including rotor elements mounted on an external periphery of the movable part of the supply pump and stator elements mounted on an internal periphery of a fixed external crown of the structural housing; and
   coupling/decoupling means to decouple the shaft of the turbine engine and the pump shaft during the first mode of operation and to couple the shaft of the turbine engine and the pump shaft during the second mode of operation.

2. A turbine engine according to claim 1, wherein the coupling/decoupling means is configured to couple the shaft of the turbine engine and the pump shaft when the speed of rotation of the shaft of the turbine engine is greater than or equal to a speed of rotation of the pump shaft.

3. A turbine engine according to claim 1, wherein the coupling/decoupling means is passive.

4. A turbine engine according to claim 1, wherein the coupling/decoupling means is in a form of a free wheel.

5. A turbine engine according to claim 1, wherein the turbine engine includes a digital regulator configured to control the mode of operation of the electrical device.

6. A turbine engine according to claim 1, wherein the equipment of the turbine engine includes electrical equipment connected to the electrical device to be supplied by the electrical device when the shaft of the turbine engine and the pump shaft are coupled.

7. A turbine engine according to claim 1, wherein the pumping module includes a power take-off element connected to the movable part of the supply pump.

8. A turbine engine according to claim 7, wherein the turbine engine includes an accessories box with an accessory shaft, and the accessory shaft of the accessories box is connected to the power take-off element.

9. A turbine engine according to claim 1, wherein the supply pump is configured to draw off fuel from the suction flange towards the delivery flange.

10. A turbine engine for a helicopter according to claim 1.

11. A method of supplying fuel to a turbine engine, the turbine engine including a shaft and a pumping module, comprising:
    a structural housing including a suction flange, to draw off fuel from a tank, and a delivery flange;
    a pump shaft connected to the shaft of the turbine engine;
    a supply pump for supplying the fuel to the turbine engine, mounted on the pump shaft and mounted inside the structural housing, configured to deliver a flow of the fuel as a function of a speed of rotation of the shaft of the turbine engine, the supply pump including a first fixed central part, joined to the structural housing, including a hollow delivery shaft connected to the delivery flange and a movable part mounted outside the fixed central part thereof;
    an electrical device mounted on the pump shaft and configured, according to a first mode of operation, to drive the pump shaft in rotation to actuate the supply pump and, according to a second mode of operation, to be driven in rotation by the pump shaft to supply electrical power to an equipment of the turbine engine, the electrical device including rotor elements mounted on an external periphery of the movable part of the supply pump and stator elements mounted on an internal periphery of a fixed external crown of the structural housing; and
    coupling/decoupling means to decouple the shaft of the turbine engine and the pump shaft during the first mode of operation and to couple the shaft of the turbine engine and the pump shaft during the second mode of operation,
    the method comprising:
        previously or simultaneously with a starting phase of the turbine engine, the electrical device drives the pump shaft in rotation to actuate the supply pump during a priming phase;
        after starting of the turbine engine, the electrical device is driven in rotation by the pump shaft to supply electrical power to equipment of the turbine engine.

12. A method according to claim 11, wherein the shaft of the turbine engine and the pump shaft are decoupled during starting of the turbine engine and coupled after starting of the turbine engine.

13. A method according to claim 12, wherein the shaft of the turbine engine and the pump shaft are coupled when the shaft of the turbine engine reaches the speed of rotation greater than a speed of rotation of the pump shaft.

14. A method according to claim 13, wherein the turbine engine is used in an aircraft and the aircraft can fly from a threshold speed of the shaft of the turbine engine, and the shaft of the turbine engine and the pump shaft are coupled at a coupling speed less than the threshold speed.

15. A method according to claim 11, wherein the priming phase and the starting phase are separated by a time delay.

* * * * *